(12) United States Patent
Yu et al.

(10) Patent No.: US 9,351,362 B2
(45) Date of Patent: May 24, 2016

(54) DIMMING CIRCUIT AND METHOD FOR LEDS

(71) Applicant: Silergy Semiconductor Technology (Hangzhou) Ltd., Hangzhou (CN)

(72) Inventors: Feng Yu, Hangzhou (CN); Hongfeng An, Hangzhou (CN)

(73) Assignee: Silergy Semiconductor Technology (Hangzhou) Ltd., Hangzhou (CN)

( * ) Notice: Subject to any disclaimer, the term of this patent is extended or adjusted under 35 U.S.C. 154(b) by 0 days.

(21) Appl. No.: 14/740,503

(22) Filed: Jun. 16, 2015

(65) Prior Publication Data
US 2016/0044755 A1 Feb. 11, 2016

Related U.S. Application Data

(63) Continuation of application No. 14/290,016, filed on May 29, 2014, now Pat. No. 9,089,026.

(30) Foreign Application Priority Data

May 30, 2013 (CN) .......................... 2013 1 0209489

(51) Int. Cl.
H05B 37/02 (2006.01)
H05B 33/08 (2006.01)

(52) U.S. Cl.
CPC ........ *H05B 33/0818* (2013.01); *H05B 33/0845* (2013.01)

(58) Field of Classification Search
CPC .... H05B 37/02; H05B 33/08; H05B 33/0815; H05B 33/0818; H05B 33/0887; H05B 20/46
USPC .......... 315/200 R, 206, 209 R, 224, 225, 291, 315/294, 299, 307, 308, 312
See application file for complete search history.

(56) References Cited

U.S. PATENT DOCUMENTS 8,829,819 B1 * 9/2014 Angeles ............. H05B 33/0815
   315/219
8,872,437 B2 10/2014 Esaki et al.

FOREIGN PATENT DOCUMENTS

| CN | 102612224 A | 7/2012 |
|---|---|---|
| CN | 102740571 A | 10/2012 |
| CN | 202535592 U | 11/2012 |
| CN | 102946674 A | 2/2013 |

OTHER PUBLICATIONS

First Chinese Office Action for Chinese Patent Application No. 201310209489.9, dated Aug. 20, 2014, 11 pages.

* cited by examiner

*Primary Examiner* — Jimmy Vu
(74) *Attorney, Agent, or Firm* — Westman, Champlin & Koehler, P.A.

(57) ABSTRACT

The present disclosure relates to dimming circuit and method for LEDs. The dimming circuit obtains a DC voltage from an external AC power supply by using a TRIAC, an electronic transformer, and a rectifier bridge sequentially. The dimming circuit comprises a first power stage circuit, a second power stage, a first control circuit, and a second control circuit. The first power stage circuit has an input terminal configured to receive the DC voltage. The second power stage has an input terminal coupled to an output terminal of the first power stage and an output terminal coupled to an LED load. The first control circuit is configured to generate a first control signal in accordance with a first output voltage generated at the output terminal of the first power stage circuit, a first reference voltage and an upper threshold voltage to maintain an average value of the first output voltage to be consistent with the first reference voltage. The second control circuit is configured to generate a dimming signal in accordance with a first current and the first output voltage to control an operation of the second power stage circuit to maintain an output current of the second power stage circuit to be consistent with an expected driving current represented by the dimming signal. The first current is no less than a holding current of the electronic transformer. An input current of the first power stage circuit is maintained to be consistent with the first current by the first control signal when the first output voltage is in a continuously increasing state and is lower than the upper threshold voltage. The first output voltage decreases continuously and the input current is maintained to be consistent with a second current after the first output voltage reaches the upper threshold voltage.

19 Claims, 9 Drawing Sheets

DIMMING CIRCUIT AND METHOD FOR LEDS

RELATED APPLICATIONS

This application is a continuation of U.S. application Ser. No. 14/290,016, filed on May 29, 2014, which claims the benefit of Chinese Patent Application No. 201310209489.9, filed on May 30, 2013, which are incorporated herein by reference in their entirety.

TECHNICAL FIELD

The present disclosure relates to the field of power electronics, and more particularly, to a dimming circuit and method for LEDs.

BACKGROUND

In the lighting field, the phase-controlled (chopping) dimming method using Triode for Alternating Current (TRIAC) is a dimming method most widely nowadays, and is widely used in the fields such as stage lighting and surrounding illumination, since it has the advantages of the small size, the reasonable price and the wide dimming power range. By applying the TRIAC phase-controlled operating principle, the supply voltage of the lamp circuit is controlled by controlling the conduction angle of the TRIAC element to chop out a part of the sine wave voltage input from the AC power network, to decrease the average value of the output voltage, so as to achieve the dimming function for LEDs.

Figure 1A:
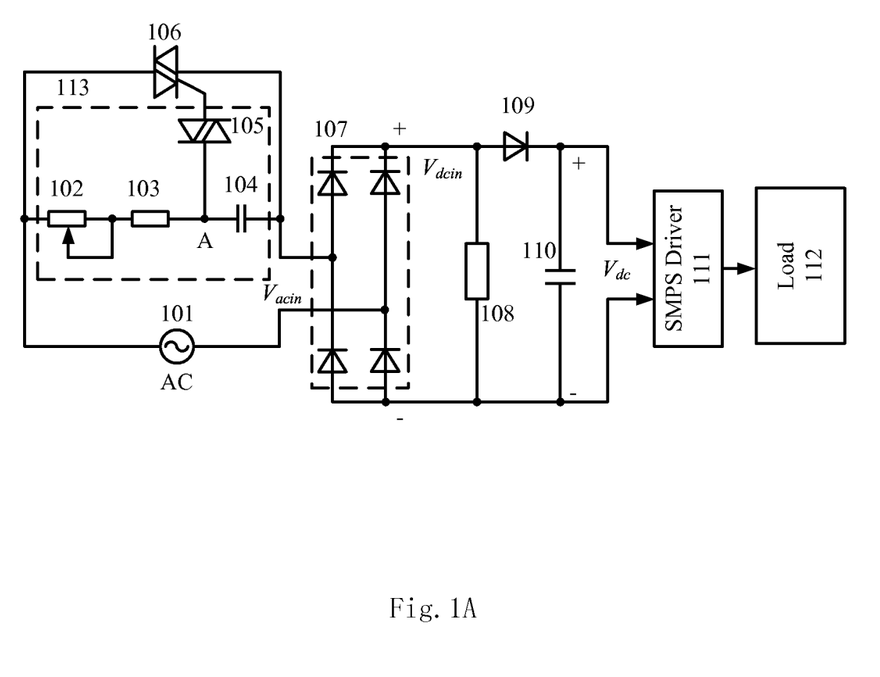
FIG. 1A illustrates a schematic block diagram of an dimming circuit with a TRIAC adopting the prior art.

FIG. 1A illustrates a principle block diagram of a dimming circuit adopting the existing TRIAC phase-controlled dimming method, which comprises an AC input power supply 101, a TRIAC 106, a trigger circuit 113, a rectifier bridge 107, a holding resistor 108, and a filter circuit consisting of a diode 109 and a filter capacitor 110. Wherein, the trigger circuit 113 may consist of a few parts, such as a DIAC 105, an adjustable resistor 102, a resistor 103 and a capacitor 104. The anode of the TRIAC 106 is coupled to one end of the AC input power supply 101, and the cathode thereof is coupled to the rectifier bridge 107; the point A in the trigger circuit consisting of the adjustable resistor 102, the resistor 103 and the capacitor 104 connected in series in turn is coupled to the control electrode of the TRIAC 106.

Figure 1B:
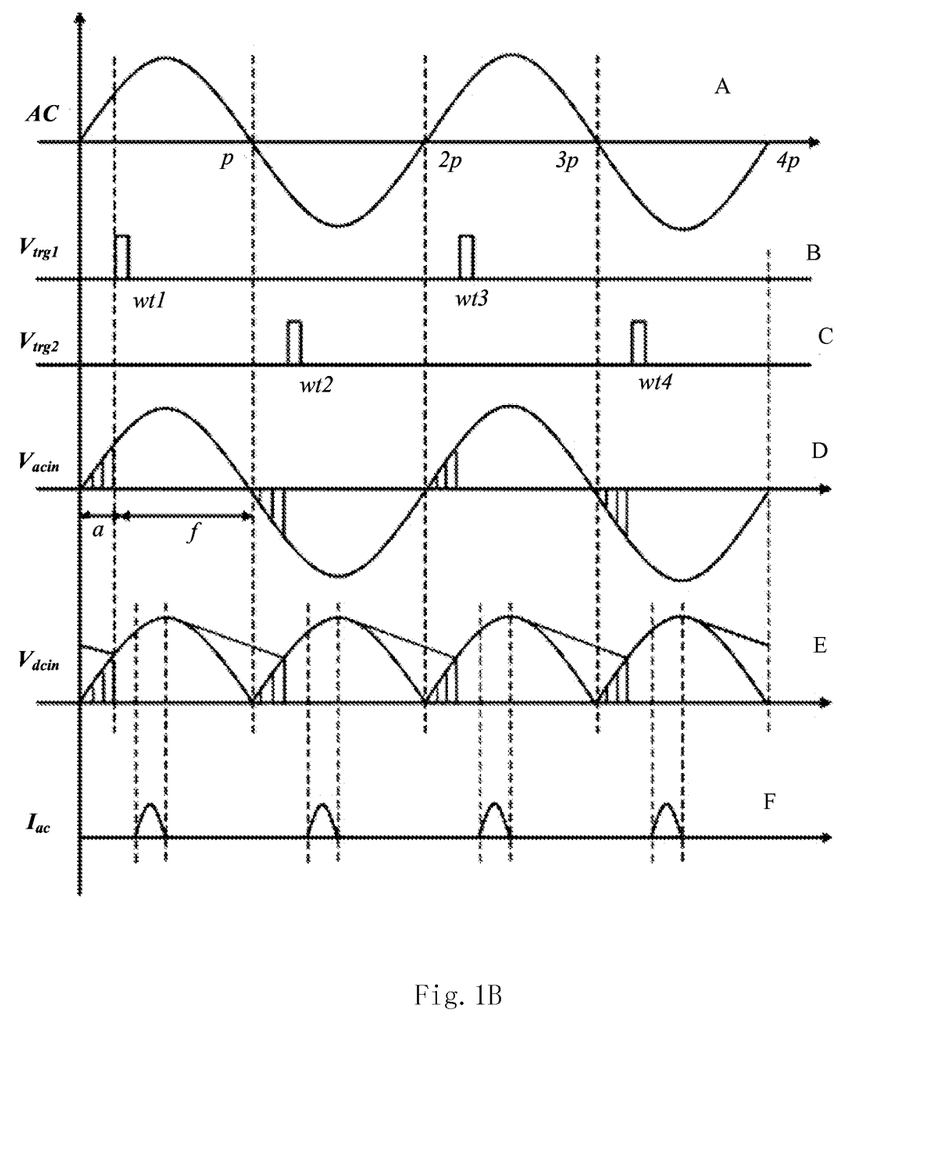
FIG. 1B illustrates an operating waveform graph of the dimming circuit with a TRIAC as shown in FIG. 1A.

During the operation, by adjusting the resistance value of the adjustable resistor 102, the voltage of the control electrode of the TRIAC 106 is changed, and the TRIAC element 106 is turned on when the voltage of the control electrode is greater than a certain voltage, so as to control the phase of the conduction angle of the TRIAC element 106 with respect to the AC input power supply 101. It can be seen, from the schematic diagram of the operating waveform of the TRIAC phase-controlled dimming with leading edge triggered, as shown in FIG. 1B, that at a certain time point $t_1$ (or a certain phase $w_{t1}$) after the zero crossing point of the voltage of the sine AC input power supply 101, a positive triggering pulse $V_{trg1}$ is applied to the control electrode of the TRIAC element 106, so that the TRIAC element 106 is turned on, which will maintain until the positive half-sinusoidal wave period ends according to the switching characteristics of the TRIAC element. Therefore, in the positive half-sinusoidal wave period (i.e., the section of $0 \sim \pi$), the TRIAC element 106 is turned off within the range of $0 \sim w_{t1}$, i.e., the control angle $\alpha$, while the TRIAC is turned on in the phase section of i.e. $w_{t1} \sim \pi$, the conduction angle $\phi$. In the same way, in the negative half-sinusoidal wave period of the AC power, a triggering pulse $V_{trg2}$ is applied at the time point $t_2$ (i.e., the phase angle $w_{t2}$) so that it is turned on. It goes round and round, and it is controlled to be turned on in each half-sinusoidal wave period to get the same conduction angle. The magnitude of the conduction angle $\phi$ (or the control angle $\alpha$) of the TRIAC can be changed by changing the triggering time (or phase) of the triggering pulse, so as to generate an AC voltage $V_{acin}$ with phase loss, which is rectified by the rectifier bridge 107 to generate the DC voltage $V_{dcin}$, and it can be seen that the greater the conduction angle $\phi$, the higher the output voltage $V_{ac}$ of the circuit, and the light from the load 112 becomes brighter by controlling the load 112 through the SMPS (Switching Mode Power Supply) driver 111.

However, the filter capacitor 110 needs to be arranged in the dimming circuit for LEDs adopting the prior art as shown in FIG. 1A. Because the capacitance of the filter capacitor 110 is high, the LC resonance in the circuit causes that the current through the TRIAC is uncontrollable, and the TRIAC cannot maintain the turned-on state, and therefore flicker occurs in the LED. In addition, the electronic transformer in the traditional circuit is originally designed for a halogen lamp rather than LED lamp, and it requires a minimum holding current to operate normally during the operation thereof. Therefore, in the LED driving circuit with the electronic transformer, the problems of the uncontrollable current and the turning off of the electronic transfer are resolved by a method for adding a dummy load (for example, the holding resistor 108); however, the power consumption of the added dummy load causes a lower operating efficiency.

Therefore, in the LED driving circuit with electronic transformer, it is a challenge how to both satisfy the requirement of the minimum current of the electronic transformer, to dim the LED load accurately so that no flicker occurs in LED load, and to keep the operating efficiency of the whole system high.

SUMMARY

In view of this, the purpose of the present disclosure is to provide a dimming circuit for LEDs and a dimming method thereof, to resolve the problems of low working efficiency, poor stability and flicker of LEDs.

According to one embodiment of the present disclosure, a dimming circuit for LEDs A dimming circuit for LEDs which obtains a DC voltage from an external AC power supply by using a TRIAC, an electronic transformer, and a rectifier bridge is provided, comprising:

a first power stage circuit having an input terminal configured to receive the DC voltage;

a second power stage having an input terminal coupled to an output terminal of the first power stage and an output terminal coupled to an LED load;

a first control circuit configured to generate a first control signal in accordance with a first output voltage generated at the output terminal of said first power stage circuit, a first reference voltage and an upper threshold voltage to maintain an average value of said first output voltage to be consistent with said first reference voltage, wherein an input current of said first power stage circuit is maintained to be consistent with a first current by said first control signal when said first output voltage is in a continuously increasing state and is lower than said upper threshold voltage, and said first output voltage is decreased continuously and said input current is maintained to be consistent with a second current after said first output voltage reaches said upper threshold voltage by said first control signal, and wherein said first current is no less than a holding current of said electronic transformer; and a second control circuit configured to generate a dimming signal in accordance with said first current and said first output voltage to control an operation of said second power stage circuit to maintain an output current of said second power stage circuit to be consistent with an expected driving current represented by said dimming signal.

According to one embodiment of the present disclosure, the first control circuit comprises:

a turn-on signal generating circuit comprising a clock signal generating circuit for generating a clock signal;

a turn-off signal generating circuit comprising a first voltage comparison circuit configured to compare the first output voltage with the upper threshold voltage to generate a first turn-off signal, and a feedback control circuit configured to receive the first output voltage, the first reference voltage and a ramp signal containing information of a peak value of inductor current, to generate a second turn-off signal; and a first logic circuit respectively coupled to the turn-on signal generating circuit and the turn-off signal generating circuit, to generate a first control signal for controlling a switching state of a first main power switch in the first power stage circuit.

Particularly, the feedback control circuit comprises:

a voltage error calculation circuit comprising an operating amplifier, a first input terminal of which receives the first output voltage and a second input terminal of which receives the first reference voltage, to generate a voltage error signal at an output terminal thereof;

a compensation circuit configured to receive the voltage error signal and to perform a compensation operation on the voltage error signal to obtain a compensation signal;

a clamp circuit with a clamp voltage which is coupled to an output terminal of the compensation circuit, and the compensation signal is clamped to the clamp voltage when the compensation signal is less than the clamp voltage which is determined in accordance with the holding current of the electronic transformer; and a square wave signal generating circuit comprising a comparator, a first input terminal of which receives the compensation signal, and a second input terminal of which receives the ramp signal, to generate the second turn-off signal at the output terminal thereof.

Particularly, the first logic circuit comprises:

a first OR-gate with two input terminals coupled to the first voltage comparison circuit and the feedback control circuit to receive the first turn-off signal and the second turn-off signal, respectively, a first RS trigger with a set terminal for receiving the clock signal, a reset terminal coupled to the output terminal of the OR-gate, and an output terminal for providing an output signal as the first control signal;

wherein the first main power switch is turned off until the TRIAC is turned on again, when the first output voltage is greater than the upper threshold voltage after the TRIAC is turned on, in each one-half period of the AC power supply; and wherein the first main power switch is turned on when the first output voltage is less than the upper threshold voltage and the clock signal is active, and the first main power switch is turned off when the ramp signal is greater than the compensation signal.

Particularly, the clamp circuit comprises:

a diode with a cathode coupled to the output terminal of the compensation circuit;

a clamping voltage source coupled to an anode of the diode.

According to one embodiment of the present disclosure, the second control circuit comprises:

a dimming signal generating circuit configured to generate the dimming signal in accordance with a duration of the first current, when the first output voltage is less than the upper threshold voltage, in a time period during which the TRIAC is turned on, in each one-half period of the AC power supply;

wherein the dimming signal generating circuit generates the dimming signal in accordance with a time period from a starting time point of the first current to a time point when the first output voltage reaches a lower threshold voltage, when the first output voltage is greater than the upper threshold voltage; and an output current control circuit configured to generate a second control signal in accordance with an error between the output current of the second power stage circuit and the expected driving current, to control the second power stage circuit.

Particularly, the dimming signal generating circuit comprises:

a second voltage comparison circuit configured to compare the first output voltage with the lower threshold voltage;

an input current comparison circuit configured to compare the input current with a current threshold;

a second logic circuit comprising a second OR-gate which has two input terminals for receiving an output signal of the second voltage comparison circuit, an output signal of the input current comparison circuit, and an output terminal for providing a square wave signal; and an averaging circuit configured to perform an averaging operation on the square wave signal and a reference voltage, to obtain the dimming signal.

Particularly, the output current control circuit is one selected from a group consisting of a peak current control circuit, an average current control circuit, and an a linear control circuit.

Particularly, the first voltage comparison circuit and the second voltage comparison circuit share a hysteresis comparator which provides an upper limit threshold voltage as the upper threshold voltage, and a lower limit threshold voltage as the lower threshold voltage.

Particularly, the first power stage circuit has a boost converter topology, and the second power stage circuit has a buck converter topology or a buck-boost converter topology.

According to one embodiment of the present disclosure, a dimming method for LEDs according to one embodiment of the present disclosure comprises:

receiving an external AC power supply;

receiving the AC power supply through a TRIAC, an electronic transformer and a rectifier bridge sequentially and adjusting the conduction angle of the TRIAC to generate a lack-phase DC voltage;

providing the DC voltage to a first power stage circuit to enable the first power stage circuit after the TRIAC is triggered to be conducted in each half-sinusoidal wave period of the AC power supply;

comparing a first output voltage at the output terminal of the first power stage circuit with an upper threshold voltage;

controlling the operation of the first power stage circuit to maintain an input current to be consistent with a first current greater than a holding current of the electronic transformer when the first output voltage is in a continuously increasing state and is less than the upper threshold voltage;

controlling the first output voltage to decrease continuously and maintaining the input current to be consistent with a second current after the first output voltage reaches the upper threshold voltage;

receiving the first output voltage by a second power stage circuit;

generating a dimming signal in accordance with the first current and the first output voltage; and controlling the operation of the second power stage circuit in accordance with the dimming signal and the output current of the second power stage circuit to maintain the output current to be consistent with an expected driving current represented by the dimming signal.

According to one embodiment of the present disclosure, generating the dimming signal comprises:

comparing the first output voltage with the upper threshold voltage in each half-sinusoidal wave period of the AC power supply;

generating the dimming signal in accordance with a duration of the first current, when the first output voltage is less than the upper threshold voltage; and generating the dimming signal in accordance with a time period from the starting time point of the first current to the time point when the first output voltage reaches a lower threshold voltage, when the first output voltage is greater than the upper threshold voltage.

According to one embodiment of the present disclosure, the method of controlling the output current of the second power stage circuit comprises:

controlling a switching state of a power switch in the second power stage circuit in accordance with an error between the output current and the expected driving current, so that the output current of the second power stage circuit is maintained to be consistent with the expected driving current.

According to one embodiment of the present disclosure, controlling the first power stage circuit comprises:

comparing the first output voltage with the upper threshold voltage;

controlling a switching state of a first main power switch of the first power stage circuit by using a peak current controlling method when the first output voltage is less than the upper threshold voltage; and turning off the first main power switch if the first output voltage is greater than the upper threshold voltage.

Particularly, the peak current controlling method comprises:

calculating an error between the first output voltage and a first reference voltage to generate an error signal;

performing a compensation operation on the error signal to generate a compensation signal;

comparing the compensation signal with a clamp signal; the clamp signal being determined by the holding current;

maintaining the compensation signal if the compensation signal is greater than the clamp signal;

clamping the compensation signal to the clamp signal when the compensation signal is less than the clamp signal;

comparing the compensation signal and a ramp signal; the ramp signal characterizing a peak value of inductor current of the first power stage circuit;

turning on the first main power switch if a clock signal is active and the ramp signal is less than the compensation signal, the input current rising continuously and the first output voltage rising continuously; and turning off the first main power switch if the ramp signal is greater than the compensation signal, the input current beginning to drop until the clock signal turns into an active state again.

According to the dimming circuit for LEDs and the dimming method thereof according to the embodiment of the present disclosure, a driving circuit structure with a double-power-stage circuit is adopted, wherein, the first power stage circuit is configured to achieve the control of the input current and the output voltage, and the second power stage circuit is configured to achieve the constant current driving of the LED load.

In this dimming control, on the one hand, the first power stage circuit maintains the input current to be greater than the holding current of the electronic transformer when the TRIAC is turned on. There is no need to use a resistor for maintain the input current, resulting in reduced power losses. Meanwhile, it avoids flicker of the LED load, which is caused by frequently or early turning-off of the electronic transformer.

On the other hand, the input power supply of the second power stage circuit is the output voltage of the first power stage circuit. Because the first power stage circuit accurately controls the input power supply of the second power stage circuit, there is no need to use a filter capacitor, which avoids an adverse effect of the filtered current on the circuit, and improves stability and reliability of the circuit.

Furthermore, the dimming demand of the LED load can be indirectly obtained by detecting the input current and the output voltage, and thus an accurate control of the driving current of the LED load can be achieved by the second power stage circuit, and an accurate dimming operation can be obtained.

DESCRIPTION OF EMBODIMENTS

Several preferred embodiments of the present disclosure will be described in detail in conjunction with the accompanying drawings as follows, however, the present disclosure is not only limited to these embodiments. The present disclosure covers any replacements, modifications, equivalents and the solutions thereof made to the spirit and the scope of the present disclosure. In order that the present disclosure is understood by the public completely, the specific details thereof are illustrated in the following preferred embodiments of the present disclosure and the present disclosure should be understood by those skilled in the art without describing the details.

Figure 2:
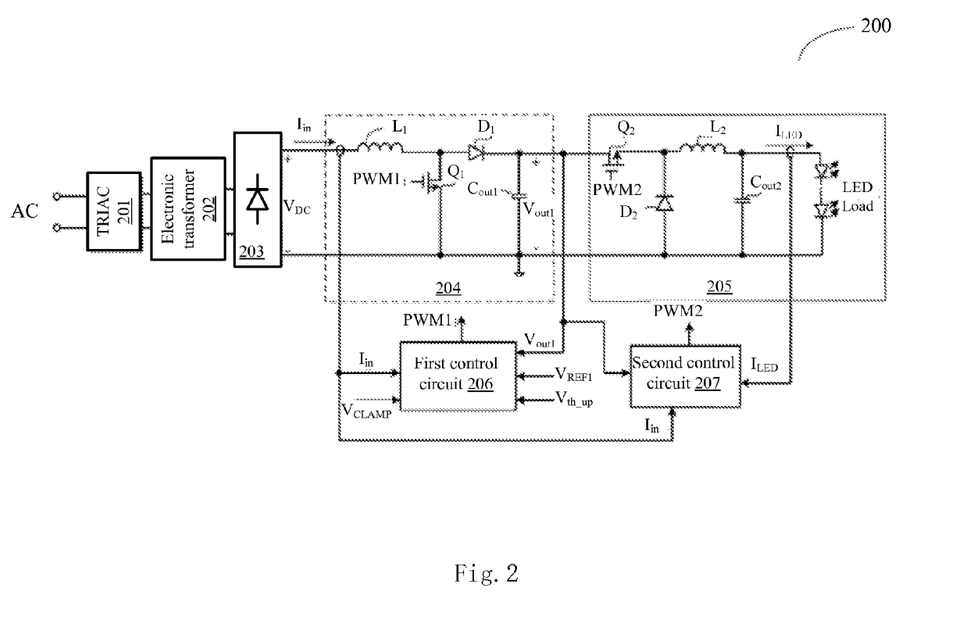
FIG. 2 illustrates a schematic block diagram of a dimming circuit for LEDs according to one embodiment of the present disclosure.

Referring to FIG. 2, the reference number 200 illustrates the schematic block diagram of the dimming circuit for LEDs according to one embodiment of the present disclosure. In this embodiment, the dimming circuit for LEDs comprises TRIAC 201, electronic transformer 202, rectifier bridge 203, first power stage circuit 204 and second power stage circuit 205 coupled in sequence, and first control circuit 206 and second control circuit 207.

DC voltage $V_{DC}$ which is a half sinusoidal waveform with phase loss is generates from external AC power supply AC by using TRIAC 201, electronic transformer 202 and rectifier bridge 203. Of course, TRIAC further requires a corresponding trigger circuit, and no detailed description thereof is made herein.

Herein, it is used as an example that first power stage circuit 204 has a boost converter topology and second power stage circuit 205 has a buck converter topology, wherein, an inductor $L_1$, first main power switch $Q_1$, diode $D_1$, and capacitor $C_{out1}$ constitute the boost converter topology and second main power switch $Q_2$, diode $D_2$, inductor $L_2$ and capacitor $C_{out2}$ constitute the buck converter topology.

DC voltage $V_{DC}$ supplies power to first power stage circuit 204, and input current $I_{in}$ corresponds to the inductor current flowing through inductor $L_1$. The voltage across capacitor $C_{out1}$ is used as first output voltage $\backslash T_{out1}$, and supplies power to second power stage circuit 205, and output current $I_{LED}$ of the output terminal of second power stage circuit 205 supplies the driving current to the LED load.

First control circuit 206 is configured to control first output voltage $V_{out1}$ and input current $I_{in}$. Particularly, first control circuit 206 receives first output voltage $V_{out1}$, first reference voltage $V_{REF1}$, the input current information and upper threshold voltage $V_{th\_up}$, to generate first control signal PWM1 accordingly. Control for first power stage circuit 204 by first control circuit 206 can be implemented by means of first control signal PWM1 output by first control circuit 206 controlling the switching state of first main power switch $Q_1$.

By means of first control circuit 206 controlling first power stage circuit 204, the average value of first output voltages $V_{out1}$ keeps consistent with first reference voltage $V_{REF1}$. Meanwhile, in each half sinusoidal wave period of AC power supply AC, if first output voltage $V_{out1}$ is in a rising state and less than upper threshold voltage $V_{th\_up}$, first control circuit 206 controls input current $I_{in}$ to be kept consistent with first current $I_{in1}$. Furthermore, it is ensured by means of clamp voltage $V_{CLAMP}$ that the value of first current $I_{in1}$ is no less than that of the holding current of electronic transformer 202. After first output voltage $V_{out1}$ reaches upper threshold voltage $V_{th\_up}$, first control circuit 206 controls input current $I_{in}$ so as to kept it consistent with second current $I_{in2}$.

Herein, first control circuit 206 can adopt the peak current control manner.

The waveforms of input current $I_{in}$ and first output voltage $V_{out1}$ may indirectly characterize the conduction angle of TRIAC 201, so second control circuit 207 generates a dimming signal according to first current $I_{in1}$ of input current $I_{in}$ and first output voltage $V_{out1}$. The dimming signal characterizes the expected driving current of the LED load required by the current conduction angle of TRIAC 201. According to the present driving current of the LED load and the dimming signal, second control circuit 207 generates second control signal PWM2, to control the switching state of second main power switch $Q_2$ in second power stage circuit 205, to control second power stage circuit 205. The dimming control of the LED load can be achieved and the constant current driving of the LED load can be achieved accurately.

Herein, second control circuit 207 can adopt a peak current control manner, an average current control manner or a linear control manner to achieve the constant current driving of the LED load. Second current $I_{in2}$ may have a value of zero, or a low value. Second power stage circuit 205 may have a buck-boost converter topology.

In the dimming circuit for LEDs according to the embodiment of the present disclosure as shown in FIG. 2, by means of the first control circuit controlling the first power stage circuit, the value of the input current is always greater than the holding current of the electronic transformer when the TRIAC is turned on, so that using the holding resistor is avoided, the power consumption is reduced, and also the problem of flicker of the LED load is avoided. In addition, the first output voltage which is basically constant can be used as the power supply to the second power stage circuit, thus no filter capacitor is required.

The dimming requirement of the LED load can be indirectly obtained by detecting the input current and the first output voltage, and further, the accurate control of the driving current of the LED load is achieved by means of the second power stage circuit, to implement an accurate dimming operation.

Figure 3:
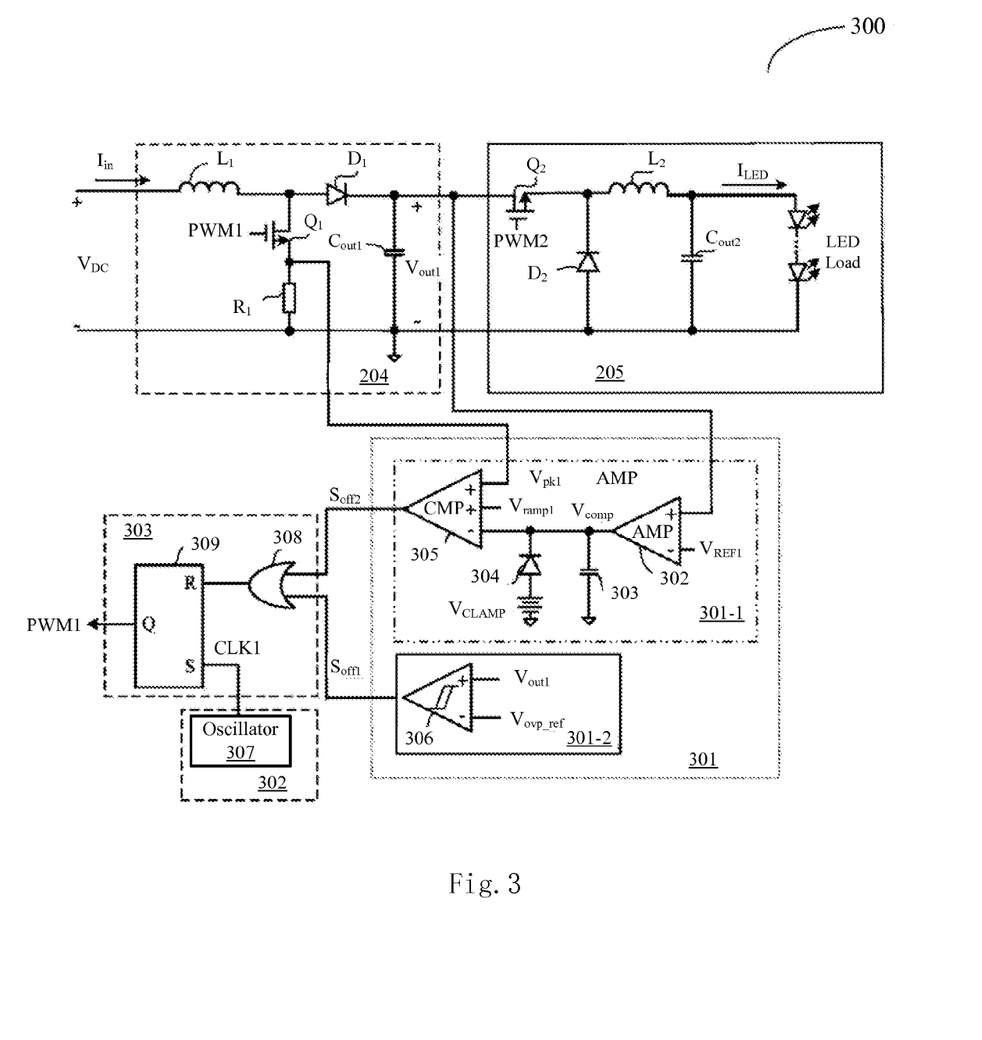
FIG. 3 illustrates a schematic block diagram of the first control circuit in the dimming circuit for LEDs according to one embodiment of the present disclosure.

FIG. 3 illustrates the schematic block diagram of the first control circuit in the dimming circuit for LEDs according to one embodiment of the present disclosure. TRIAC 201, electronic transformer 202 and rectifier 203 are omitted in FIG. 3 for an explanation.

First control circuit 300 can include turn-off signal generating circuit 301, turn-on signal generating circuit 302 and first logic circuit 303. Wherein, turn-off signal generating circuit 301 can include first voltage comparison circuit 301-2 and feedback control circuit 301-1.

Specifically, first voltage comparison circuit 301-2 is configured to compare first output voltage $V_{out1}$ with upper threshold voltage $V_{th\_up}$, to generate first turn-off signal $S_{off1}$.

One implementation of first voltage comparison circuit 301-2 may be hysteresis comparator 306, the upper limit threshold voltage thereof is upper threshold voltage $V_{th\_up}$, and the lower limit threshold voltage thereof is lower threshold voltage $V_{th\_low}$ or a voltage signal proportional to the upper threshold voltage and the lower threshold voltage. The non-inverting input terminal of hysteresis comparator 306 receives first output voltage $V_{out1}$ or a voltage signal proportional to it, the inverting input terminal thereof receives reference value $V_{ovp\_ref}$ or a voltage signal proportional to it, and the output signal of the output terminal thereof is used as first turn-off signal $S_{off1}$. When first output voltage $V_{out1}$ reaches upper threshold voltage $V_{th\_up}$, first turn-off signal $S_{off1}$ turns into a high level.

Feedback control circuit 301-1 adopts a peak current control circuit to generate second turn-off signal $S_{off2}$ according to first output voltage $V_{out1}$, first reference voltage $V_{REF1}$ and a ramp signal including the information of a peak value of inductor current.

One implementation of feedback control circuit 301-1 can be implemented by a voltage error calculation circuit, a compensation circuit, a clamping circuit and a square wave signal generating circuit.

Herein, the voltage error calculation circuit can include operational amplifier 302, the non-inverting input terminal of which receives first output voltage $V_{out1}$ and the inverting input terminal of which receives first reference voltage $V_{REF1}$, to output the error between first output voltage $V_{out1}$ and first reference voltage $V_{REF1}$.

The compensation circuit is configured to perform a compensation operation on the error signal output from operational amplifier 302, to obtain compensation signal $V_{comp}$. The compensation circuit can be implemented in many manners, for example, capacitor 303 or a RC circuit consisting of a resistor and a capacitor.

The clamping circuit is coupled to the output terminal of the compensation circuit, which has a clamp voltage determined by the holding current of the electronic transformer. One implementation of the clamping circuit can be implemented by clamping voltage source $V_{CLAMP}$ and diode 304. The anode of diode 304 is coupled to clamping voltage source $V_{CLAMP}$, and the cathode thereof is coupled to the output terminal of the compensation circuit. The value of the clamp voltage equals to the difference between the value of clamping voltage source $V_{CLAMP}$ and the voltage drop of diode 304. When compensation signal $V_{comp}$ is less than the clamp voltage, compensation signal $V_{comp}$ is clamped to the clamp voltage.

The square wave signal generating circuit comprises comparator 304, which is configured to compare compensation signal $V_{comp}$ with voltage signal $V_{pk1}$ characterizing the information of a peak value of inductor current, and the square wave signal of the output terminal thereof is used as second turn-off signal $S_{off2}$. A peak value of inductor current can be indirectly obtained by adopting voltage signal $V_{pk1}$ across resistor $R_1$ connected in series to first main power switch $Q_1$. In the embodiment, considering the influence to the input current due to the change of the duty ratio of the power switch and in order to improve the stability, ramp signal $V_{ramp}$ is added on the basis of the voltage signal $V_{pk1}$ to obtain a signal with ramp which is compared with compensation signal $V_{comp}$ later, so that the disturbance to the average inductor current value due to the different duty ratio of the first control signal is eliminated and the stability of the system is improved.

By adopting this control manner, compensation signal $V_{comp}$ determines the magnitude of a peak value of inductor current, so it can be ensured by clamping voltage source $V_{CLAMP}$ that the minimum value of the first current of the input current is not less than the holding current of the electronic transformer.

turn-on signal generating circuit 302 may comprise oscillator 307 to generate clock signal CLK1 with a fixed frequency.

First logic circuit 303 includes first OR gate 308 and first RS trigger 309. Two input terminals of OR gate 308 receive respectively first turn-off signal $S_{off1}$ and second turn-off signal $S_{off2}$. The set terminal of first RS trigger 309 receives clock signal CLK1, the reset terminal thereof receives the output signal of OR gate 308, and the output signal of the output terminal thereof is used as first control signal PWM1, to control the switching state of first main power switch $Q_1$.

Figure 4:
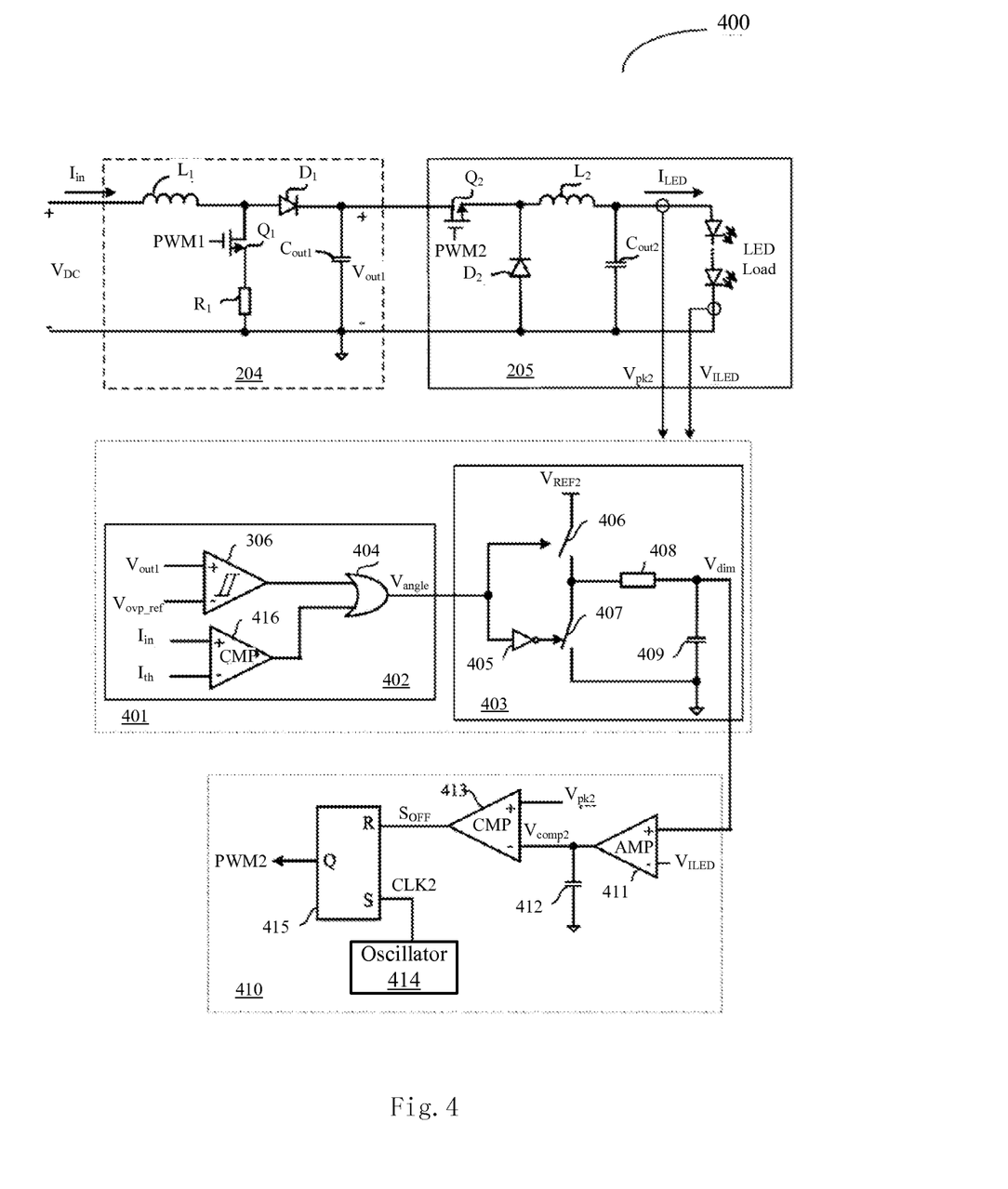
FIG. 4 illustrates a schematic block diagram of the second control circuit in the dimming circuit for LEDs according to one embodiment of the present disclosure.

FIG. 4 illustrates the schematic block diagram of the second control circuit in the dimming circuit for LEDs according to one embodiment of the present disclosure.

In this embodiment, the second control circuit 400 comprises dimming signal generating circuit 401 and output current controlling circuit 410. Wherein, dimming signal generating circuit 401 generates dimming signal $V_{dim}$ according to the holding time of first current $I_{in1}$, if first output voltage $V_{out1}$ is always less than upper threshold voltage $V_{th\_up}$, in the time period when TRIAC 201 is turned on, in each half sinusoidal wave period of AC power supply AC.

If first output voltage $V_{out1}$ is greater than upper threshold voltage $V_{th\_up}$, dimming signal generating circuit 401 generates dimming signal $V_{dim}$ according to the time period from the starting time point of first current $I_{in1}$ to the time point when first output voltage $V_{out1}$ reaches lower threshold voltage $V_{th\_low}$.

Output current controlling circuit 410 generates second control signal PWM2 according to the error between the output current of second power stage circuit 205 and the expected driving current represented by the dimming signal, to control the switching state of second main power switch $Q_2$ in second power stage circuit 205.

Particularly, dimming signal generating circuit 401 can be implemented by the second voltage comparison circuit, an input current comparison circuit, a second logic circuit and an averaging circuit.

The second voltage comparison circuit is configured to compare first output voltage $V_{out1}$ with lower threshold voltage $V_{th\_low}$. Herein, hysteresis comparator 306 shown in FIG. 3 is used as one of implementations.

The input current comparison circuit is configured to compare input current $I_{in}$ with current threshold $I_{th}$, which can be implemented by comparator 416. The non-inverting input terminal of comparator 416 receives a voltage signal represented by the input current $I_{in}$ and the inverting input terminal thereof receives another voltage signal represented by current threshold $I_{th}$. Current threshold $I_{th}$ may have a low value, for example, zero, the holding current of the electronic transformer, or the like.

The second logic circuit comprises OR gate 404, one input terminal of OR gate 404 is coupled to the output signal of comparator 416 to receives the comparison results between input current $I_{in}$ and current threshold $I_{th}$, and the other input terminal thereof receives the comparison result between first output voltage $V_{out1}$ and lower threshold voltage $V_{th\_low}$. The output signal at the output terminal of OR gate 404 is used as the square wave signal $V_{angle}$ represented by the conduction angle of the TRIAC.

Averaging circuit 403 is configured to perform an averaging operation on received square wave signal $V_{angle}$ and reference voltage $V_{REF2}$ to generate a smooth dimming signal $V_{dim}$ represented by the conduction angle of TRIAC 201. The averaging circuit can adopt any appropriate form of circuit. In this embodiment, averaging circuit 403 comprises inverter 405, controllable switch 406 and controllable switch 407. The switching state of controllable switch 406 corresponds to the square wave signal $V_{angle}$, and the switching state of controllable switch 407 is complementary with square wave signal $V_{angle}$. Resistor 408 and capacitor 409 perform a filtering operation on the voltage at the common connection point of controllable switch 406 and controllable switch 407, so as to generate the dimming signal $V_{dim}$ at one end of the capacitor 409.

Output current control circuit 410 adopts a peak current control manner. It comprises operational amplifier 411, compensation capacitor 412, comparator 413, oscillator 414 and RS trigger 415.

The non-inverting input terminal of operational amplifier 411 receives dimming signal $V_{dim}$, and the inverting input terminal thereof receives voltage signal $V_{ILED}$ represented by the present driving current of the LED load, and a compensation operation is performed on the error signal at the output terminal thereof by compensation capacitor 412 to generate the compensation signal $V_{comp2}$. The non-inverting input terminal of comparator 413 receives voltage signal $V_{pk2}$ representing a peak value of inductor current of second power stage circuit 205 and the inverting input terminal thereof receives compensation signal $V_{comp2}$.

The set terminal of first RS trigger 415 receives clock signal CLK2 output by oscillator 414, and the reset terminal thereof receives the output signal of comparator 413, and the output signal at the output terminal thereof is used as second control signal PWM2.

Figure 5A:
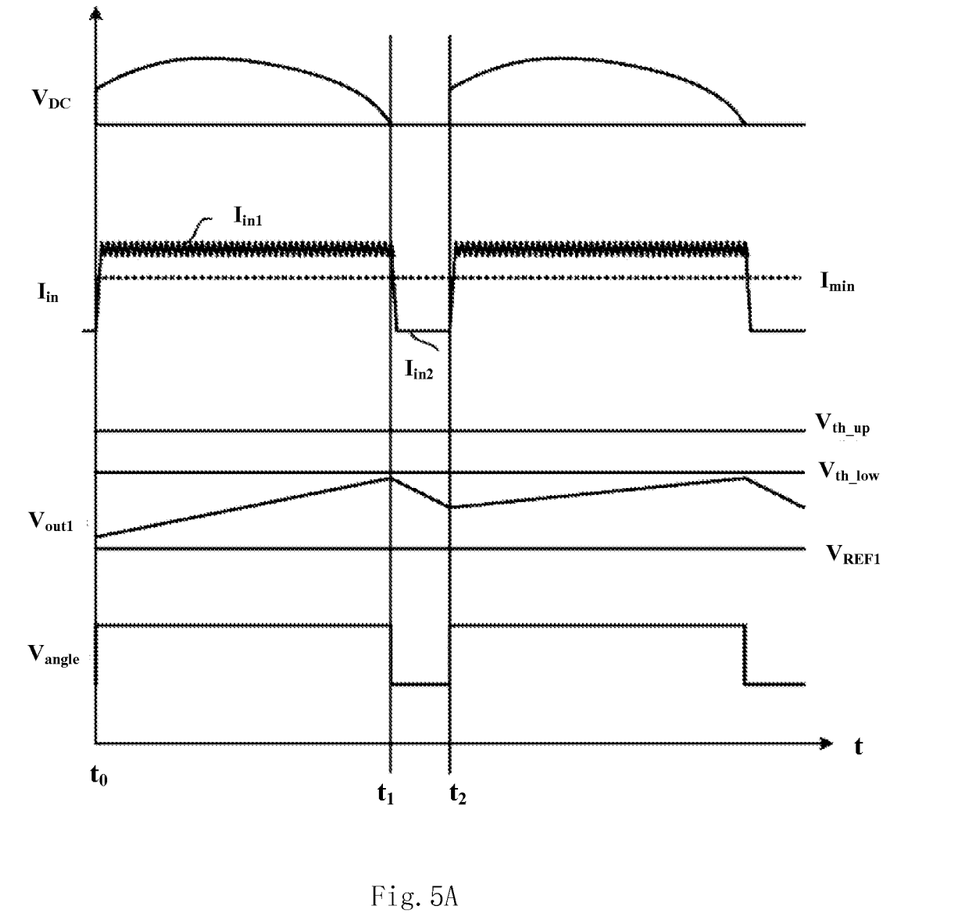
FIG. 5A illustrates an operating waveform graph for the first operating mode of the dimming circuit for LEDs according to the embodiment of the present disclosure.

The operating principle of the dimming circuit for LEDs comprising the first control circuit and the second control circuit as shown in FIGS. 4 and 5 is described in detail in conjunction with the specific operating waveforms as follows.

FIG. 5A illustrates the operating waveform graph for the first operating mode of the dimming circuit for LEDs according to the embodiment of the present disclosure.

TRIAC 201 is turned on and begins to output DC voltage $V_{DC}$ at time point $t_0$ in a half sinusoidal wave period of AC power supply AC. First main power switch Q1 is turned on, input current $I_{in}$ begins to increase gradually, voltage signal $V_{pk1}$ increases gradually, and first output voltage $V_{out1}$ increases gradually. If the sum of voltage signal $V_{pk1}$ and ramp signal $V_{ramp1}$ reaches compensation signal $V_{comp}$, the output signal of comparator 305 turns into a high level. First RS trigger 309 is reset by OR gate 308, the output signal of the Q terminal thereof turns into a low level, and first control signal PWM1 turns off main power switch $Q_1$. Therefore, input current $I_{in}$ begins to decrease until clock signal CLK1 turns into a high level again and input current $I_{in}$ increases gradually again. The frequency of the clock signal CLK1 is high, so the drop in the value of input current $I_{in}$ is slight. Input current $I_{in}$ has a value with a slight fluctuation, which has a basically smooth waveform, and is maintained to be a constant value (first current $I_{in1}$).

In the first operating mode as shown in FIG. 5A, the LED load requires a larger power, and first control circuit 206 controls input current $I_{in}$ as a high value. By setting upper threshold voltage $V_{th\_up}$ and lower threshold voltage $V_{th\_low}$ with higher values, first output voltage $V_{out1}$ does not exceed upper threshold voltage $V_{th\_up}$ in this operating mode. The output signal of hysteresis comparator 306 is maintained to be a low level, therefore, the turn-off signal of first main power switch $Q_1$ is always determined by feedback control circuit 301-1, until the present half wave period ends (the time point t1). In the time period when TRIAC 201 is turned off (the time point $t_1$ to $t_2$), the value of DC voltage $V_{DC}$ equals to zero, and input current $I_{in}$ decreases to zero (the second current $I_{in2}$) and maintains until TRIAC 201 is turned on again at time point $t_2$ in the next half wave period. It goes round and round, the control of first output voltage $V_{out1}$ and input current $I_{in}$ is implemented by means of the peak current control mode. The average value of first output voltage $V_{out1}$ is maintained to be consistent with first reference voltage $V_{REF1}$. The input current is maintained to be consistent with the first current if there is input current in the time period when TRIAC 201 is turned on, by above peak current control manner. Furthermore, the first current is high enough to satisfy the requirement of the holding current of electronic transformer 202 by clamping the value of the first current by means of the clamp circuit. Therefore, the output signal of hysteresis comparator 306 is always maintained to be at a low level in this operating mode, so square wave signal $V_{angle}$ representing the conduction angle of TRIAC 201 is determined in accordance with the duration of the input current (the first current). In the time period when TRIAC 201 is turned on, the input current is always greater than the current threshold, and therefore the output signal of comparator 416 is always maintained to be at a high level until the present half wave period ends.

Figure 5B:
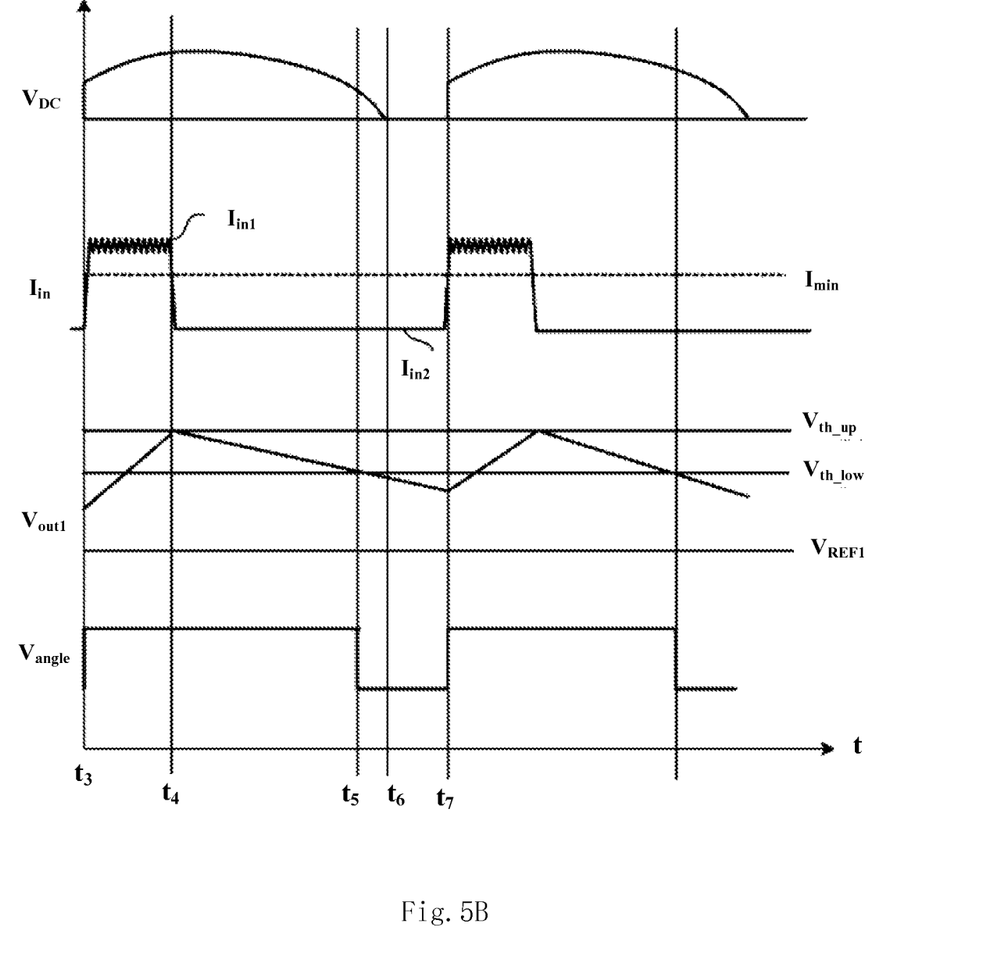
FIG. 5B illustrates an operating waveform graph for the second operating mode of the dimming circuit for LEDs according to the embodiment of the present disclosure.

FIG. 5B illustrates an operating waveform graph for the second operating mode of the dimming circuit for LEDs according to the embodiment of the present disclosure.

TRIAC 201 is turned on and begins to output DC voltage $V_{DC}$ with phase loss at time point $t_3$ in a half sinusoidal wave period of AC power supply AC. First main power switch $Q_1$ is turned on, input current $I_{in}$ begins to increase gradually, the voltage signal $V_{pk1}$ increases gradually, and the first output voltage $V_{out1}$ increases gradually. If the sum of voltage signal $V_{pk1}$ and ramp signal $V_{ramp1}$ reaches compensation signal $V_{comp}$, the output signal of comparator 305 turns into a high level. First RS trigger 309 is reset by OR gate 308, the output signal of the Q terminal thereof turns into a low level, and first control signal PWM1 turns off main power switch Q1. Therefore, input current $I_{in}$ begins to drop until clock signal CLK1 turns into a high level again and input current $I_{in}$ increases gradually again. The frequency of clock signal CLK1 is high, so the drop in the value of input current $I_{in}$ is slight. Input current $I_{in}$ has a value with a slight fluctuation, which has a basically smooth waveform, and is maintained to be a constant value (first current $I_{in1}$).

In the first operating mode as shown in FIG. 5B, the LED load requires low power, and first control circuit 206 controls input current $I_{in}$ as a low value. However, the value of the first current is high enough to satisfy the requirement of the holding current of electronic transformer 202 since the clamp circuit clamps the first current. First output voltage $V_{out1}$ exceeds upper threshold voltage $V_{th\_up}$ at time point $t_4$, if the minimum value of the input current is greater than the requirement of the LED load. The output signal of hysteresis comparator 306 turns into a high level, therefore, first main power switch $Q_1$ is turned off, first output voltage $V_{out1}$ decreases continuously, and the input current reaches zero, until the current half wave period ends (time point $t_6$). The return difference of hysteresis comparator 306 is set as a high value so that the time point (time point $t_5$) when the first output voltage reaches the lower threshold voltage is close to the end time point of the present half wave period. In this operating mode, from time point $t_3$ to time point $t_4$, the input current is greater than the current threshold, therefore the output signal of comparator 416 is maintained to be at a high level and the square wave signal is also maintained to be at a high level. From time point $t_4$ to time point $t_5$, although the output signal of comparator 416 turns into a low level, the output signal of hysteresis comparator 306 turns into a high level, and therefore the square wave signal is still maintained to be at a high level. From time point $t_5$ to time point $t_7$ when TRIAC 201 is turned on in next half wave period, both the output signal of hysteresis comparator 306 and that of comparator 416 are at low level, and the square wave signal turns into a low level.

Therefore, in this operating mode, square wave signal $V_{angle}$ representing the conduction angle of TRIAC 201 is determined according to the time period from the starting time point of the first current to the time point when the first output voltage drops below lower threshold voltage $V_{th\_low}$.

The implementations of the first control circuit and the second control circuit are described above in detail in conjunction with the specific embodiments, and according to the teaching of the present disclosure, those skilled in the art can infer other suitable circuit structures, such as, the feedback control circuit and the control circuit of the output circuit can adopt other circuit structures according to the control mode. The second power stage circuit can be selected as a buck-boost converter topology.

The dimming method for the LED load according to the present disclosure is described as follows in conjunction with specific embodiments.

Figure 6:
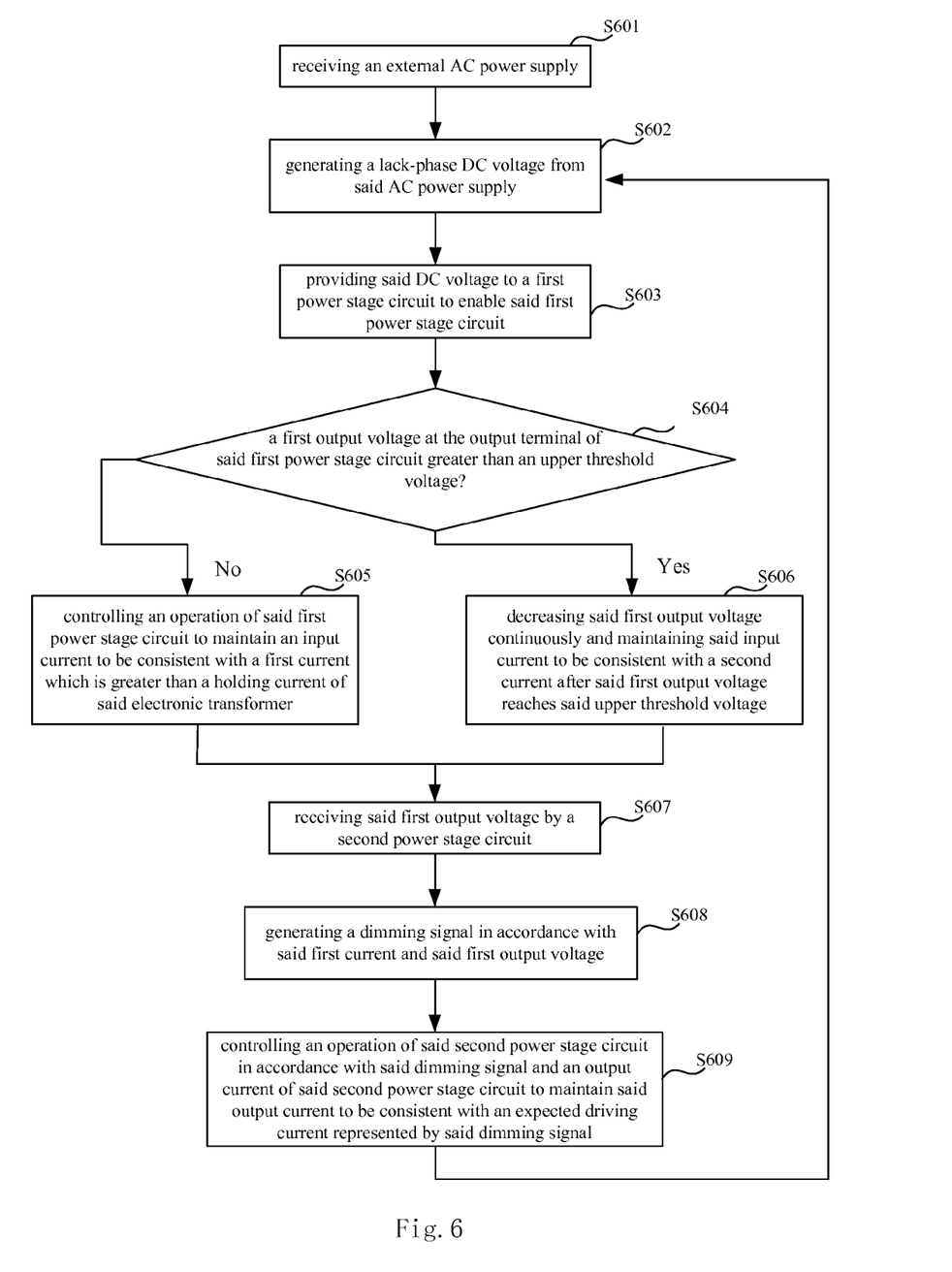
FIG. 6 illustrates a flowchart of a dimming method for LEDs according to one embodiment of the present disclosure.

FIG. 6 illustrates a flowchart of a dimming method for LEDs according to one embodiment of the present disclosure. The dimming method for LEDs comprises:

S601: receiving the external AC power supply;

S602: receiving the AC power supply through a TRIAC, an electronic transformer and a rectifier bridge sequentially and adjusting the conduction angle of the TRIAC to generate a lack-phase DC voltage;

S603: providing the DC voltage to a first power stage circuit to enable the first power stage circuit after the TRIAC is triggered to be conducted in each half-sinusoidal wave period of the AC power supply;

S604: comparing a first output voltage at the output terminal of the first power stage circuit with an upper threshold voltage;

S605: controlling the operation of the first power stage circuit to maintain an input current to be consistent with a first current greater than a holding current of the electronic transformer when the first output voltage is in a continuously increasing state and is less than the upper threshold voltage;

S606: controlling the first output voltage to decrease continuously and maintaining the input current to be consistent with a second current after the first output voltage reaches the upper threshold voltage;

S607: receiving the first output voltage by a second power stage circuit;

S608: generating a dimming signal in accordance with the first current and the first output voltage; and S609: controlling the operation of the second power stage circuit in accordance with the dimming signal and the output current of the second power stage circuit to maintain the output current to be consistent with an expected driving current represented by the dimming signal.

Herein, the second current may have a value equal to zero. The first power stage circuit may have a boost converter topology; the second power stage circuit may have a buck converter topology or a buck-boost converter topology.

It can be implemented that the second power stage circuit drives the LED load based on the dimming method for LEDs according to the present disclosure. The value of the input current is always greater than that of the holding current of the electronic transformer if the input current does not equal to zero within the time period when the TRIAC is turned on, by controlling the first power stage circuit, so as to avoid using the holding resistor, reduce the power consumption, and also avoid the problem of flicker of the LED load. In addition, the basically constant first output voltage can be used as the power supply to the second power stage circuit, and therefore, the filter capacitor is not required any more.

On the other hand, the dimming requirement of the LED load can be obtained indirectly by detecting the first current and the first output voltage, and the accurate control of the driving current of the LED load is achieved by the second power stage circuit, to implement the accurate dimming operation.

In the dimming method for the LED load as shown in FIG. 6, generating the dimming signal can be implemented by the following manners. Particularly, it comprises:

comparing the first output voltage with the upper threshold voltage in each half-sinusoidal wave period of the AC power supply;

generating the dimming signal in accordance with a duration of the first current, when the first output voltage is less than the upper threshold voltage; and generating the dimming signal in accordance with a time period from the starting time point of the first current to the time point when the first output voltage reaches a lower threshold voltage, when the first output voltage is greater than the upper threshold voltage.

Figure 7:
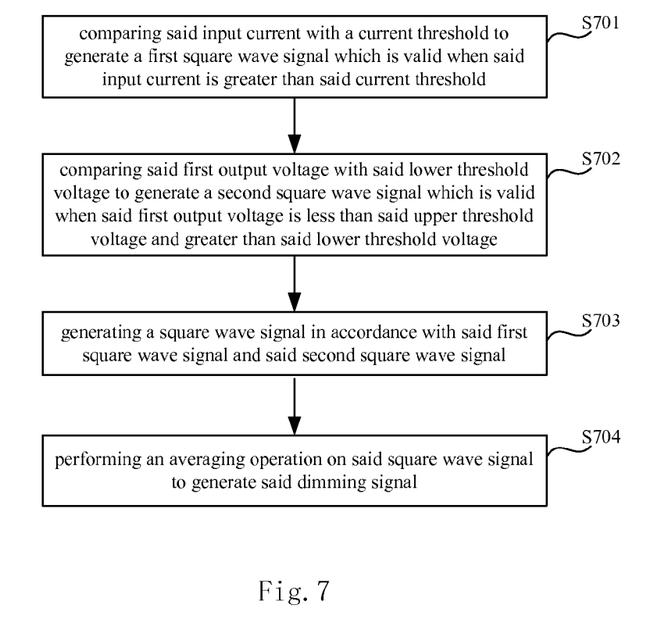
FIG. 7 illustrates a flowchart of a method for generating a dimming signal in the dimming method for LEDs according to one embodiment of the present disclosure.

FIG. 7 illustrates the flowchart of the method for generating the dimming signal according to one embodiment of the present disclosure. Particularly, the method for generating the dimming signal includes:

S701: comparing the input current with a current threshold to generate a first square wave signal which is active when the input current is greater than the current threshold;

S702: comparing the first output voltage with the lower threshold voltage to generate a second square wave signal which is active when the first output voltage is less than the upper threshold voltage and greater than the lower threshold voltage;

S703: generating a square wave signal in accordance with the first square wave signal and the second square wave signal, wherein the square wave signal is active when the first square wave signal or the second square wave signal is active; and S704: performing an averaging operation on the square wave signal, to generate the dimming signal.

In the dimming method for the LED load as shown in FIG. 6, one specific embodiment of the control method of the output current of the second power stage circuit may comprises the following step:

Controlling the switching state of the second main power switch in the second power stage circuit so that the output current of the second power stage circuit corresponds to the expected driving current.

Of course, the second power stage circuit may adopt different current control modes, such as a peak current control mode, an average current control mode, or a linear current control mode based on LED lamp string. Sampling the output current can be controlled by sampling the inductor current, the output current or the driving current through each LED string, according to the difference in the current control modes.

Figure 8:
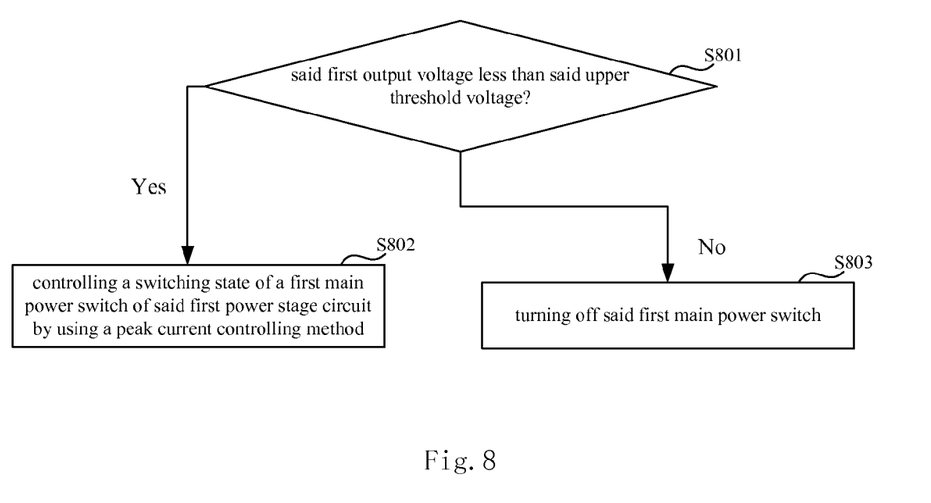
FIG. 8 illustrates a flowchart of a method for controlling the first power stage circuit in the dimming method for LEDs according to one embodiment of the present disclosure.

FIG. 8 illustrates the flowchart of the method for controlling the first power stage circuit according to one embodiment of the present disclosure. Particularly, controlling the first power stage circuit comprises:

S801: comparing the first output voltage with the upper threshold voltage;

S802: controlling a switching state of a first main power switch of the first power stage circuit by using a peak current controlling method when the first output voltage is less than the upper threshold voltage; and S803: turning off the first main power switch if the first output voltage is greater than the upper threshold voltage.

Wherein, the peak current control method can be implemented by the following method. It comprises steps as follows:

generating an error signal based on an error between the first output voltage and a first reference voltage;

generating a compensation signal by a compensation operation on the error signal;

comparing the compensation signal with a clamp signal which is determined by the holding current;

maintaining the compensation signal if the compensation signal is greater than the clamp signal;

clamping the compensation signal to the clamp signal when the compensation signal is less than the clamp signal;

comparing the compensation signal with a ramp signal which represents a peak value of inductor current of the first power stage circuit;

turning on the first main power switch when a clock signal is active and the ramp signal is less than the compensation signal so that both the input current and the first output voltage increases continuously; and turning off the first main power switch when the ramp signal is greater than the compensation signal so that the input current decreases until the clock signal becomes active again.

What is required to explain is that the devices with the same name have the same function among various embodiments of the present disclosure. The circuit structure includes but is not limited to the above disclosed manners, and can be any structure if it can implement the functions of the related circuits described in the embodiments of the present disclosure. For example, the output current control circuit of the second power stage circuit can adopt any current control circuit with a suitable circuit structure according to different current control modes. Although it is not described in detail in above embodiments, the skilled in the art can select a suitable known or improved output current control circuit according to the current control mode. Therefore, related modifications based on the circuits disclosed in embodiments of the present disclosure made by those skilled in the art, also fall into the scope of the embodiments of the present disclosure.

In addition, what is further required to explain is that, the relation terms such as "first" and "second" are only used to distinguish one entity or operation from the other entity or operation, and not necessary to require or suggest that there are any actual relationships or orders among these entities or operations. Furthermore, terms, "include", "comprise", or other variants means covering, rather than including exclusively, so that the process, the method, the item, or the apparatus including a series of elements includes not only those elements, but also other elements not listed definitely, or inherent elements of the process, the method, the item, or the apparatus. The element defined by the sentence of "includes a . . . " does not exclude the situation that additional same elements are included in the process, the method, the item or the apparatus including the element without more limitations.

According to embodiments of the present disclosure as described above, these embodiments neither elaborate all details, nor limit the present disclosure to the described specific embodiments. Obviously, many modifications and variations can be made according to the above depiction. These embodiments are selected and described in the description in detail, just for the sake of explaining the principle and the actual application of the present disclosure, so that those skilled in the art can use the present disclosure better and modify and use it based on the present disclosure. The present disclosure is only limited by claims, and all scopes and the equivalents thereof.

What is claimed is:

1. A dimming circuit for LEDs which obtains a DC voltage from an external AC power supply by using a TRIAC, an electronic transformer, and a rectifier bridge sequentially, comprising:
   a first power stage circuit having an input terminal configured to receive said DC voltage;
   a second power stage having an input terminal coupled to an output terminal of said first power stage and an output terminal coupled to an LED load;
   a first control circuit configured to generate a first control signal in accordance with a first output voltage generated at said output terminal of said first power stage circuit, a first reference voltage and an upper threshold voltage to maintain an average value of said first output voltage to be consistent with said first reference voltage; and a second control circuit configured to generate a dimming signal and control an operation of said second power stage circuit in accordance with said dimming signal to maintain an output current of said second power stage circuit to be consistent with an expected driving current represented by said dimming signal,
   wherein said dimming circuit operates in one of a first operating mode and a second operating mode,
   in said first operating mode, an input current of said first power stage circuit is maintained to be a first current which is no less than a holding current of said electronic transformer, when said first output voltage is in a continuously increasing state and is less than said upper threshold voltage, in a time period during which said TRIAC is turned on, in each half-sinusoidal wave period of said AC power supply, and said second control circuit generates said dimming signal in accordance with said first current,
   in said second operating mode, said input current is maintained to be said first current when said first output voltage is in a continuously increasing state and is less than said upper threshold voltage, and said input current is maintained to a second current after said first output voltage reaches said upper threshold voltage and then decreases continuously, after said TRIAC is turned on, in each half-sinusoidal wave period of said AC power supply, and said second control circuit generates said dimming signal in accordance with said first current and said first output voltage.

2. The dimming circuit according to claim 1, wherein said first control circuit comprises:
   a turn-on signal generating circuit comprising a clock signal generating circuit for generating a clock signal;
   a turn-off signal generating circuit comprising a first voltage comparison circuit configured to compare said first output voltage with said upper threshold voltage to generate a first turn-off signal, and a feedback control circuit configured to receive said first output voltage, said first reference voltage and a ramp signal containing information of a peak value of inductor current, to generate a second turn-off signal; and
   a first logic circuit coupled to said turn-on signal generating circuit and said turn-off signal generating circuit, to generate said first control signal for controlling a switching state of a first main power switch in said first power stage circuit.

3. The dimming circuit according to claim 2, wherein said feedback control circuit comprises:
   a voltage error calculation circuit comprising an operating amplifier, a first input terminal of which receives said first output voltage and a second input terminal of which receives said first reference voltage, to generate a voltage error signal at an output terminal thereof;
   a compensation circuit configured to receive said voltage error signal and to perform a compensation operation on said voltage error signal to obtain a compensation signal; and
   a clamp circuit with a clamp voltage coupled to an output terminal of said compensation circuit, and said compensation signal being clamped to said clamp voltage when said compensation signal is less than said clamp voltage which is determined in accordance with said holding current of said electronic transformer; and
   a square wave signal generating circuit comprising a comparator, a first input terminal of which receives said compensation signal, and a second input terminal of which receives said ramp signal, to generate a second turn-off signal at an output terminal thereof.

4. The dimming circuit according to claim 3, wherein said first logic circuit comprises:
a first OR-gate with two input terminals respectively coupled to said first voltage comparison circuit and said feedback control circuit to receive said first turn-off signal and said second turn-off signal,
a first RS trigger with a set terminal for receiving said clock signal, a reset terminal coupled to said output terminal of said OR-gate, and an output terminal for providing an output signal as said first control signal;
wherein said first main power switch is turned off until said TRIAC is turned on again, when said first output voltage is greater than said upper threshold voltage after said TRIAC is turned on, in each half-sinusoidal wave period of said AC power supply; and
wherein said first main power switch is turned on when said first output voltage is less than said upper threshold voltage and said clock signal is active, and is turned off when said ramp signal is greater than said compensation signal.

5. The dimming circuit according to claim 3, wherein said clamp circuit comprises:
a diode with a cathode coupled to said output terminal of said compensation circuit;
a clamping voltage source coupled to an anode of said diode.

6. The dimming circuit according to claim 1, wherein said second control circuit comprises:
a dimming signal generating circuit configured to generate said dimming signal in accordance with a duration of said first current, when said first output voltage is less than said upper threshold voltage, in a time period during which said TRIAC is turned on, in each half-sinusoidal wave period of said AC power supply, and to generate said dimming signal in accordance with a time period from a starting time point of said first current to a time point when said first output voltage reaches a lower threshold voltage, when said first output voltage is greater than said upper threshold voltage; and
an output current control circuit configured to generate a second control signal in accordance with an error between said output current of said second power stage circuit and said expected driving current, to control said second power stage circuit.

7. The dimming circuit according to claim 6, wherein said dimming signal generating circuit comprises:
a second voltage comparison circuit configured to compare said first output voltage with said lower threshold voltage;
an input current comparison circuit configured to compare said input current with a current threshold;
a second logic circuit comprising a second OR-gate which has two input terminals for receiving an output signal of said second voltage comparison circuit and an output signal of said input current comparison circuit, respectively, and an output terminal for providing a square wave signal; and
an averaging circuit configured to perform an averaging operation on said square wave signal and a reference voltage, to obtain said dimming signal.

8. The dimming circuit according to claim 6, wherein said output current control circuit is one selected from a group consisting of a peak current control circuit, an average current control circuit, and an a linear control circuit.

9. The dimming circuit according to claim 2, wherein said first voltage comparison circuit and said second voltage comparison circuit share a hysteresis comparator which provides an upper limit threshold voltage as said upper threshold voltage, and a lower limit threshold voltage as said lower threshold voltage.

10. The dimming circuit according to claim 1, wherein said second current has a value equal to zero.

11. The dimming circuit according to claim 1, wherein said first power stage circuit has a boost converter topology, and said second power stage circuit has a buck converter topology or a buck-boost converter topology.

12. A dimming method for LEDs, comprising:
receiving an external AC power supply;
generating a lack-phase DC voltage from said AC power supply by using a TRIAC, an electronic transformer and a rectifier bridge sequentially and by adjusting a conduction angle of said TRIAC;
providing said DC voltage to a first power stage circuit to enable said first power stage circuit after said TRIAC is triggered to be conducted in each half-sinusoidal wave period of said AC power supply;
comparing a first output voltage at said output terminal of said first power stage circuit with an upper threshold voltage;
controlling an operation of said first power stage circuit to maintain an input current to be consistent with a first current which is greater than a holding current of said electronic transformer when said first output voltage is in a continuously increasing state and is less than said upper threshold voltage, in a time period during which said TRIAC is turned on;
generating said dimming signal in accordance with said first current;
maintaining said input current to be said first current when said first output voltage is in a continuously increasing state and is less than said upper threshold voltage, and maintaining said input current to a second current after said first output voltage reaches said upper threshold voltage and then decreases continuously, in a time period during which said TRIAC is turned on;
generating said dimming signal in accordance with said first current and said first output voltage;
decreasing said first output voltage continuously and maintaining said input current to be consistent with a second current after said first output voltage reaches said upper threshold voltage;
receiving said first output voltage by a second power stage circuit;
generating a dimming signal in accordance with said first current and said first output voltage; and
controlling an operation of said second power stage circuit in accordance with said dimming signal and an output current of said second power stage circuit to maintain said output current to be consistent with an expected driving current represented by said dimming signal.

13. The dimming method for LEDs according to claim 12, wherein generating said dimming signal comprises:
comparing said first output voltage with said upper threshold voltage in each half-sinusoidal wave period of said AC power supply;
generating said dimming signal in accordance with a duration of said first current, when said first output voltage is less than said upper threshold voltage; and
generating said dimming signal in accordance with a time period from said starting time point of said first current to said time point when said first output voltage reaches a lower threshold voltage, when said first output voltage is greater than said upper threshold voltage.

14. The dimming method for LEDs according to claim 13, wherein generating said dimming signal comprises:
   comparing said input current with a current threshold to generate a first square wave signal which is active when said input current is greater than said current threshold;
   comparing said first output voltage with said lower threshold voltage to generate a second square wave signal which is active when said first output voltage is less than said upper threshold voltage and greater than said lower threshold voltage;
   generating a square wave signal in accordance with said first square wave signal and said second square wave signal, wherein said square wave signal is active when said first square wave signal or said second square wave signal is active; and
   performing an averaging operation on said square wave signal to generate said dimming signal.

15. The dimming method for LEDs according to claim 12, wherein controlling said output current of said second power stage circuit comprises:
   controlling a switching state of a power switch in said second power stage circuit in accordance with an error between said output current and said expected driving current to maintain said output current of said second power stage circuit to be consistent with said expected driving current.

16. The dimming method for LEDs according to claim 12, wherein controlling said first power stage circuit comprises:
   comparing said first output voltage with said upper threshold voltage;
   controlling a switching state of a first main power switch of said first power stage circuit by using a peak current controlling method when said first output voltage is less than said upper threshold voltage; and
   turning off said first main power switch when said first output voltage is greater than said upper threshold voltage.

17. The dimming method for LEDs according to claim 16, wherein said peak current controlling method comprises:
   generating an error signal based on an error between said first output voltage and a first reference voltage;
   generating a compensation signal by a compensation operation on said error signal;
   comparing said compensation signal with a clamp signal which is determined by said holding current;
   maintaining said compensation signal when said compensation signal is greater than said clamp signal;
   clamping said compensation signal to said clamp signal when said compensation signal is less than said clamp signal;
   comparing said compensation signal with a ramp signal which represents a peak value of inductor current of said first power stage circuit;
   turning on said first main power switch when a clock signal is active and said ramp signal is less than said compensation signal so that both said input current and said first output voltage increases continuously; and
   turning off said first main power switch when said ramp signal is greater than said compensation signal so that said input current decreases until said clock signal becomes active again.

18. The dimming method for LEDs according to claim 12, wherein said second current has a value equal to zero.

19. The dimming method for LEDs according to claim 12, wherein said first power stage circuit has a boost converter topology, and said second power stage circuit has a buck converter topology or a buck-boost converter topology.

* * * * *